United States Patent [19]
Zalewski

[11] Patent Number: 5,040,832
[45] Date of Patent: Aug. 20, 1991

[54] AUTOMOBILE SEAT FOR DISABLED PERSONS

[75] Inventor: Wojciech Zalewski, Belmont, Mass.

[73] Assignee: Enhancement Unlimited, Inc., Newton, Mass.

[21] Appl. No.: 490,086

[22] Filed: Mar. 7, 1990

[51] Int. Cl.$^5$ .............................................. B60N 1/10
[52] U.S. Cl. ........................ 296/65.1; 297/DIG. 10; 414/462
[58] Field of Search ................... 296/65.10; 297/344, 297/DIG. 10, 330, 346; 414/462

[56] References Cited

U.S. PATENT DOCUMENTS

| | | | |
|---|---|---|---|
| 2,266,200 | 12/1941 | Hedley . | |
| 2,290,464 | 7/1942 | Buchheit | 296/65.1 |
| 2,641,305 | 6/1953 | Oishei | 296/65.1 |
| 4,083,599 | 4/1978 | Gaffrey | 297/330 X |
| 4,155,587 | 5/1979 | Milchell | 296/65.1 |
| 4,479,752 | 10/1984 | Todd | 296/65.1 |
| 4,600,239 | 7/1986 | Gerstein | 297/349 |
| 4,733,903 | 3/1988 | Bailey | 296/65.1 |
| 4,815,785 | 3/1989 | Goodall et al. | 296/65.1 |

Primary Examiner—Robert R. Song
Attorney, Agent, or Firm—Morse, Altman, Dacey & Benson

[57] ABSTRACT

A seat for disabled driver or passenger at the door of an automotive vehicle, the door moving between closed and open positions at a doorway through which the seat is accessible. The seat comprises a seat cushion including a stationary cushion component remote from the doorway and a lift cushion component adjacent to the doorway, the lift cushion component being constrained for movement in a path between a retracted position and an extended position. The lift cushion component, when in extended position, is located upwardly of its retracted position. The lift cushion component is controlled by an operational system that includes a manual actuator for maintaining movement between the retracted position and the extended position when under constant manual control. The actuator is accessible to constant manual control at the window sill of a front door of the automotive vehicle.

18 Claims, 5 Drawing Sheets

AUTOMOBILE SEAT FOR DISABLED PERSONS

FIELD OF THE INVENTION

The present invention relates to automobile seats and, more particularly, to car seats of the type for assisting a disabled driver or passenger in accommodating himself or herself to and extricating himself or herself from an automobile front seat.

BACKGROUND OF THE INVENTION

It is well known that many persons with anatomical problems resulting from arthritis, rheumatism, bodily injury, surgical trauma, low back pain syndrome, sciatica, etc. experience difficulties when attempting to fit themselves into and extricate themselves from seating in an automobile. Spacial constraints including low headroom, projecting controls, steering wheel proximity, and door and window obstructions require bending and twisting contortions by the driver or passenger as he or she fits into or alights from the car seat.

Confronted with such difficulties, a disabled person may be forced to limit or forego automobile travel. Prior constructions designed primarily to assist only paraplegics and other severely impaired drivers generally have been unwieldy and obtrusive in use, as well as unadapted for concommitant use by normal drivers and passengers. The present invention is a response to difficulties of the type confronting persons with limited or severe impairment.

SUMMARY OF THE INVENTION

The primary object of the present invention is to provide a car seat, primarily either a driver's or front passenger's seat, which accommodates all drivers normally, but which also optionally assists disabled drivers and passengers to fit themselves into and extricate themselves from a front seat of a car. For ease of explanation, a driver's bucket seat behind the steering wheel is illustrated in the drawings and described in the specification. It is to be understood, however, that a passenger's front seat also is contemplated and, in design, is essentially a mirror image of the driver's seat described in detail.

In normal mode, the car seat of the present invention presents seat and back cushions of conventional appearance and comfort. A normal driver or passenger can sit down while facing outwardly through an open door and swing his or her legs and torso into a normal driving posture facing the windshield. From driving posture, a normal driver or passenger can swing his or her legs and torso around to permit standing up through an open doorway.

In assist mode, the car seat cushion preferably divides into two parts, an outer movable lift cushion that is adjacent to the car door and an inner stationary cushion that is remote from the car door. The lift cushion operates electromechanically under the control of a disabled driver or passenger between an extended position and a retracted position. It provides a seat that gently controls the anatomy of the disabled driver or passenger between standing and sitting postures at the open door. When in retracted position, it permits the disabled driver or passenger to swing his or her legs and torso between forward and sideward orientations.

Preferably, the configuration of the seat cushion as a whole is contoured to present a slight trough at the forward edge which tends to retain the torso of the driver in forward orientation. The side of the lift cushion at the doorway is rounded to enable the driver or passenger to glide into successive postures as it extends or retracts. The arrangement is such that the mechanism for extending and retracting the lift cushion is retained within the automobile when its associated door is closed.

Other objects of the present invention will in part be obvious and will in part appear hereinafter.

BRIEF DESCRIPTION OF THE DRAWINGS

For a fuller understanding of the nature and objects of the present invention, reference is made to the accompanying drawings, wherein.

DETAILED DESCRIPTION OF THE PREFERRED EMBODIMENT

Figure 2:
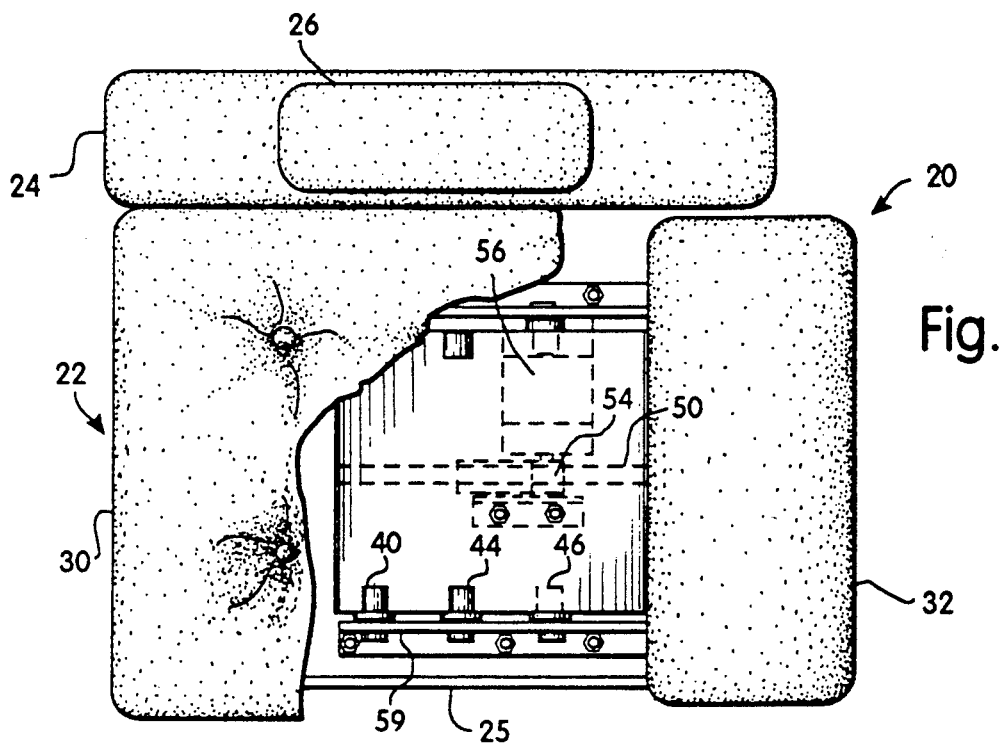
FIG. 2 is a top plan view of the car seat of FIG. 2, partly broken away.
Figure 1:
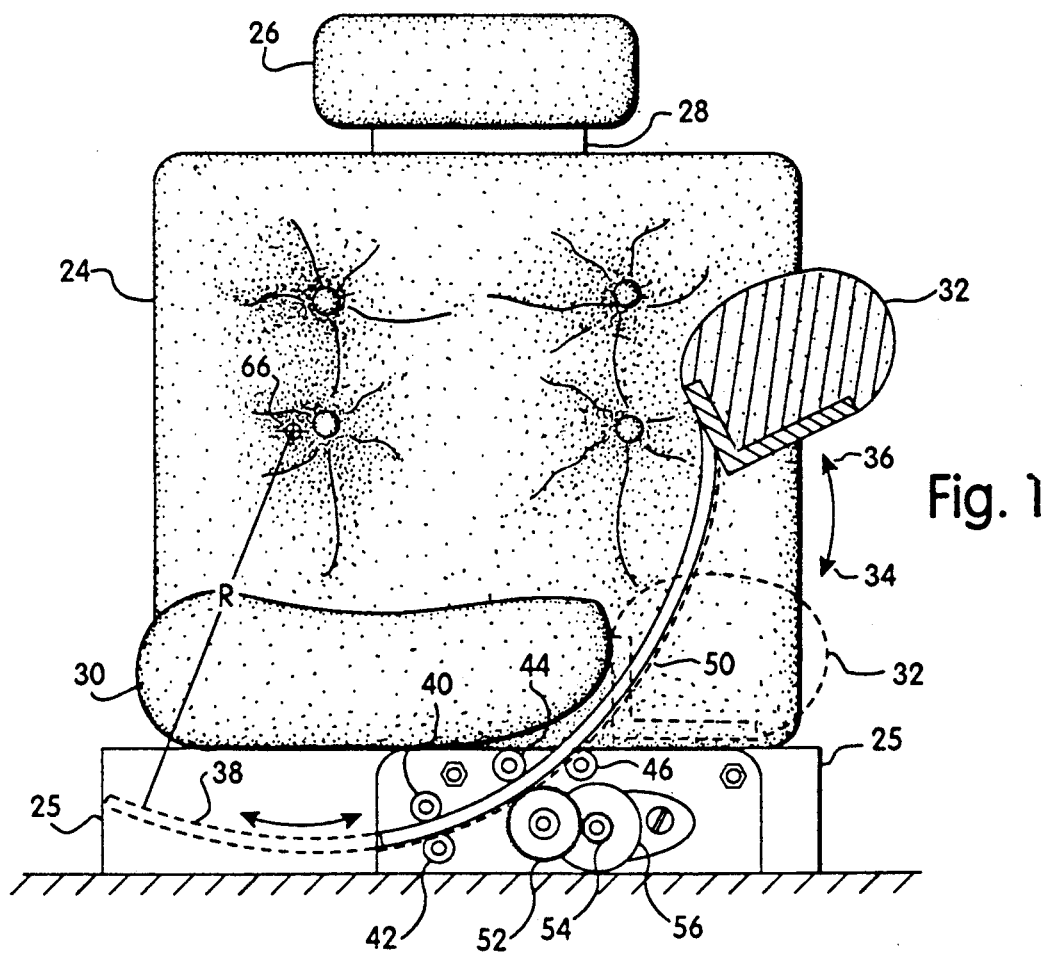
FIG. 1 is a front view, partly broken away and partly in phantom, to show operation of the car seat of the present invention.

The illustrated embodiment, as shown in FIGS. 1 and 2, is a driver's seat 20 comprising a seat cushion assemblage 22, a back cushion 24 and a head cushion 26. Seat cushion assemblage 22 and back cushion 24 are carried by a frame, the base of which is shown at 25 and the back of which (not shown) projects upwardly into back cushion 24. Back cushion 24 and head cushion 26 are of conventional design. Head cushion 26 is carried at the upper end of a mounting plate 28 which projects into a guide (not shown) at the top of the upright part of the frame within back cushion 24, by which its height is adjustable.

Seat cushion assemblage 22 includes a stationary cushion 30 and a lift cushion 32. Lift cushion 32 is constrained for movement between a retracted position, as at 34, and an extended position, as at 36. When lift cushion 32 is retracted, it presents, together with stationary cushion 30, a composite cushion assemblage with contours that comfortably seat both regular and disabled drivers. The profile across the front of the composite cushion assemblage, as seen in FIG. 1, is a trough, the center of which is somewhat lower than the opposed sides of the stationary cushion and the lift cushion.

Figure 3:
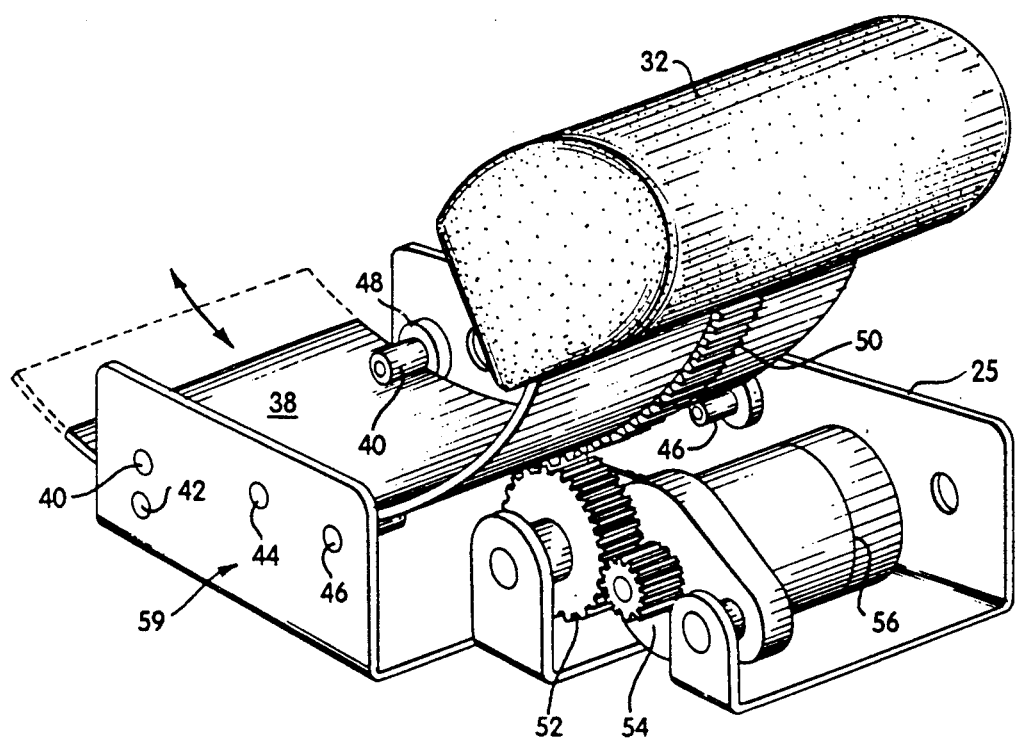
FIG. 3 is a perspective view of the mechanism for extending and retracting the lift cushion.
Figure 3A:
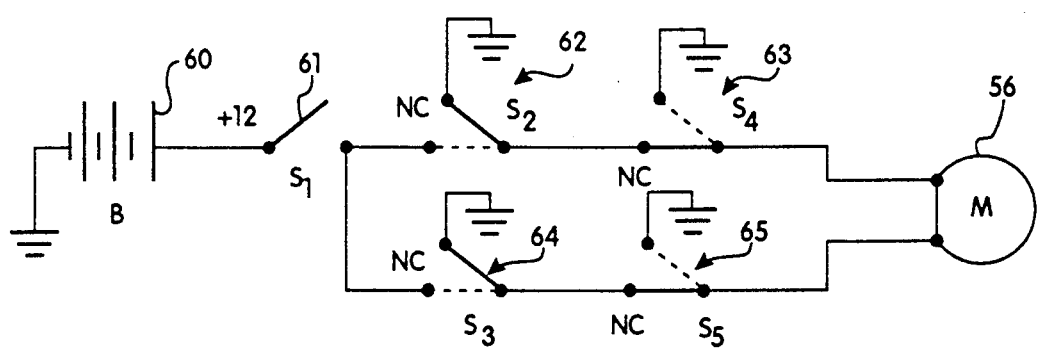
FIG. 3a is a block diagram of the electrical control system.

As shown in FIG. 3, the mechanism for carrying the lift cushion between its extreme positions 34 and 36 includes a curved cantilever slide 38 which is welded to an L-shaped bracket at its outer extremity for supporting the lift cushion. Movement of cantilever slide 38 is constrained at its opposed edges by pairs of opposed rollers 40, 42 and 44, 46, which have outer collars 48 for laterally retaining slide 38. Midway between the edges of slide 38 is affixed an arcuate rack 50 which is driven through a gear 52 by a pinion 54. Pinion 54 is mounted on the shaft of an electric motor 56 that is controlled by a circuit generally shown at 58 in FIG. 3a. Rollers 40, 42, 44, 46, gearing 52, 54 and motor 56 are mounted on a bracket construction 59 that is secured to base 25.

As shown in FIG. 1, the point 66 about which slide 38 orbits is the center of a radius R. The theoretical location of this center is in the vicinity of and somewhat below the shoulder and toward the center of the car with respect to the driver when seated, so that the lift cushion moves first in a generally outward direction and then in a generally upward direction. Preferably, when viewed across the front of seat 20, the width of lift cushion 32 is no more than one-half the total width of the composite cushion so that it is free to clear the steering wheel no matter what the forward position of the car seat. In an alternative embodiment, however, the lift cushion constitutes the entire composite seat cushion, and the stationary cushion is omitted.

Motor 56 is powered by: the car battery 60; an "up" safety switch 62; a "down" safety switch 64; an interlock switch 61 which immobilizes the circuit when the door is closed; and a pair of limit switches 63, 65 which interrupt power when the lift cushion reaches its most extended or retracted position. Switches 62, 64, which are located in the vicinity of the window sill of the door at the driver's seat, must be controlled continuously by the driver in order to continuously energize motor 56. Thus, any lapse in the driver's capacity or attention, as a safety precaution, will interrupt movement of the lift cushion. Switch 62 causes lift cushion 32 to extend. Switch 64 causes lift cushion 32 to retract. FIGS. 4 through 7 depict the successive postures of the driver as he exits from a car through an open door.

Figure 4:
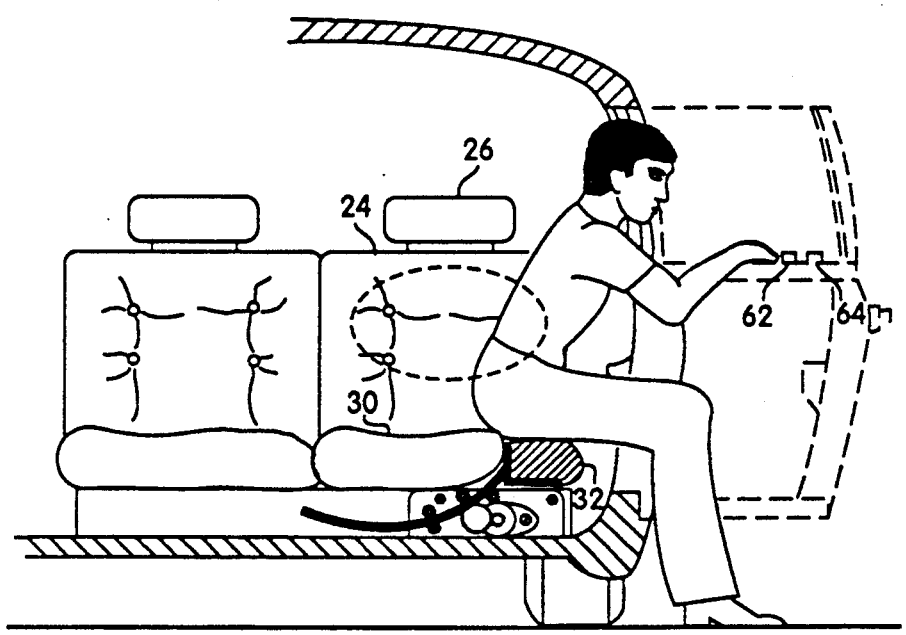
FIGS. 4, 5, 6 and 7 illustrate the operation of the illustrated embodiment.
Figure 5:
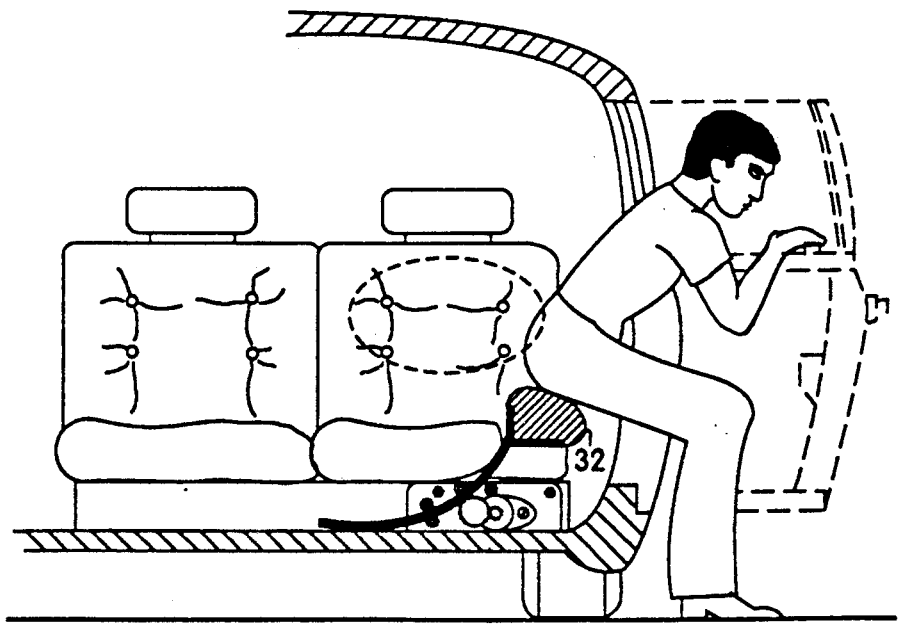
Figure 6:
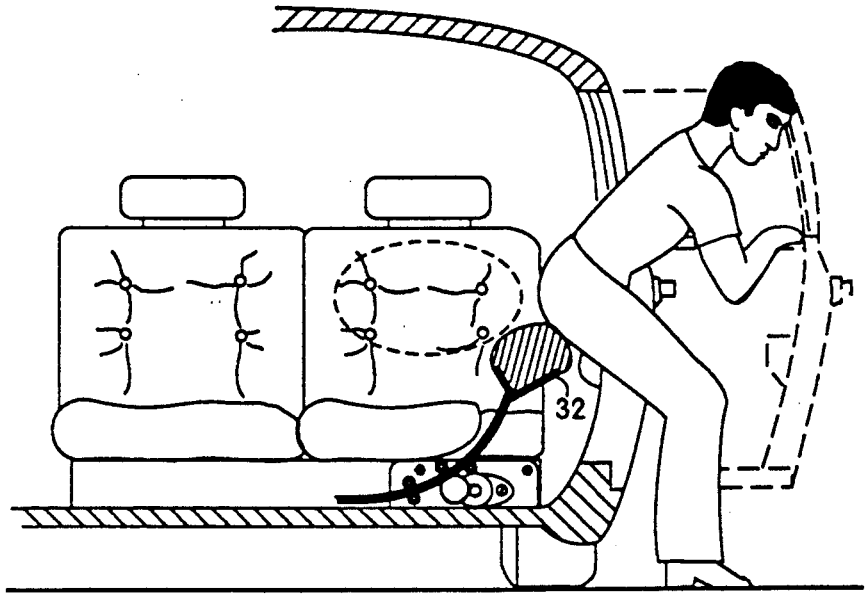
Figure 7:
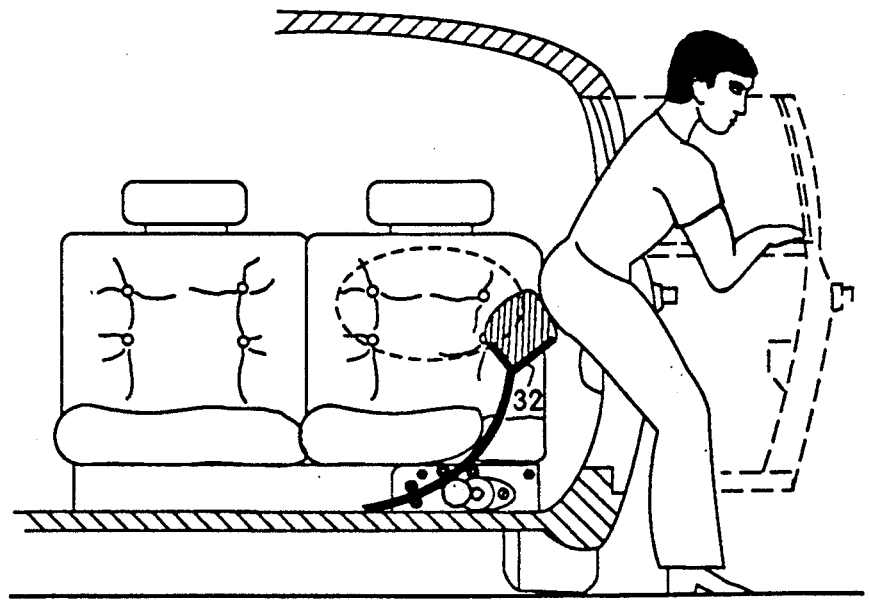

As shown in FIG. 4, the driver has swung his legs out from under the steering wheel and through the open door. His hands are resting on the window sill, his right hand being in position to maintain contact with and control of the "up" switch to cause the lift cushion to extend. As the lift cushion moves outwardly and upwardly, the driver's grip on the window sill steadies his body as his posture changes. As shown in FIG. 5, the driver may be required to tilt his head in order to avoid contact with the roof. As the lift cushion moves, the driver slides gradually and comfortably about its rounded outer edge. As shown in FIG. 6, extension of the lift cushion continues as the driver emerges through the open doorway and approaches standing posture. As shown in FIG. 7, the driver, almost standing upright, is able to carry on with normal movement.

When entering the car, the driver sits against the rounded edge of the extended lift cushion, and maintains manual contact with and continued control of the "down" switch as he proceeds through a sequence of steps that are opposite to the steps described above in reference to FIGS. 4 through 7. The lift cushion mechanism prevents the door from closing unless the lift cushion is entirely within the car and clear of the doorway. However, the car can be locked completely with the lift cushion at least partly extended so as to be ready for a returning disabled driver. Alternatively, the car can be locked with the lift cushion retracted so as to be ready for use by a normal driver or ready to be extended for use by a disabled driver.

Figure 8:
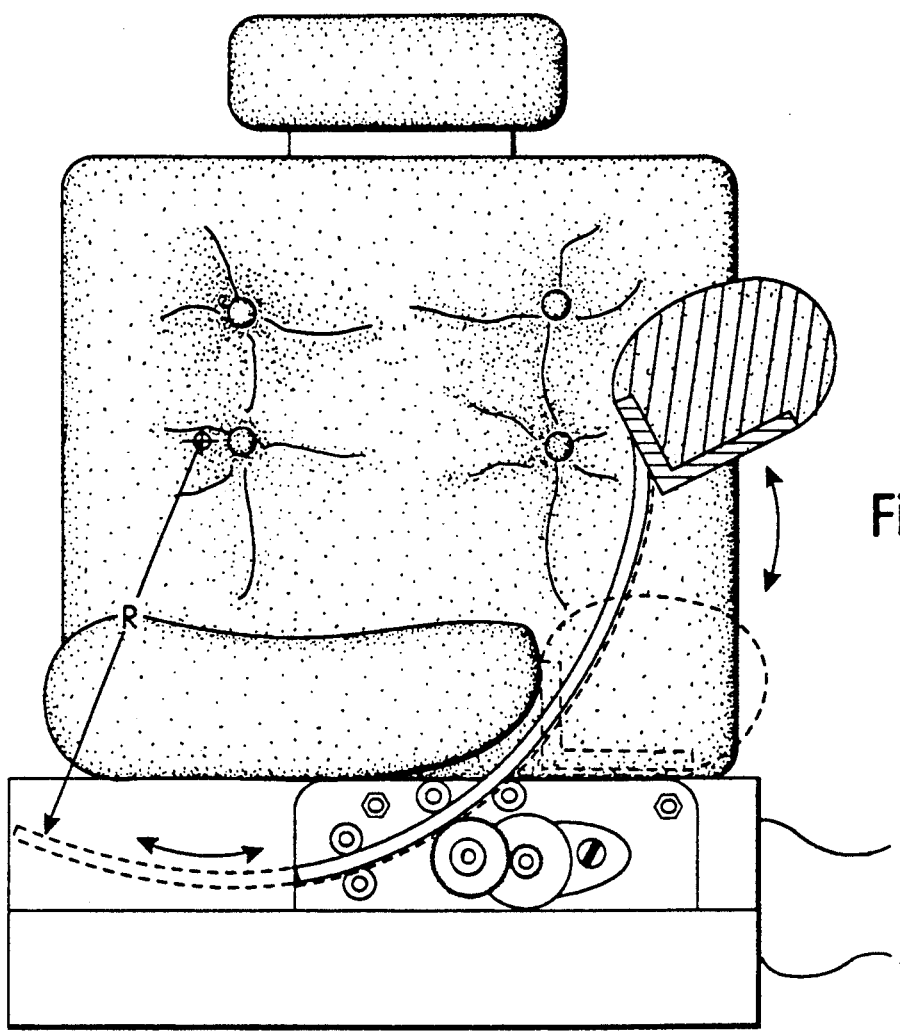
FIG. 8 is a front view of an alternative embodiment.
Figure 9:
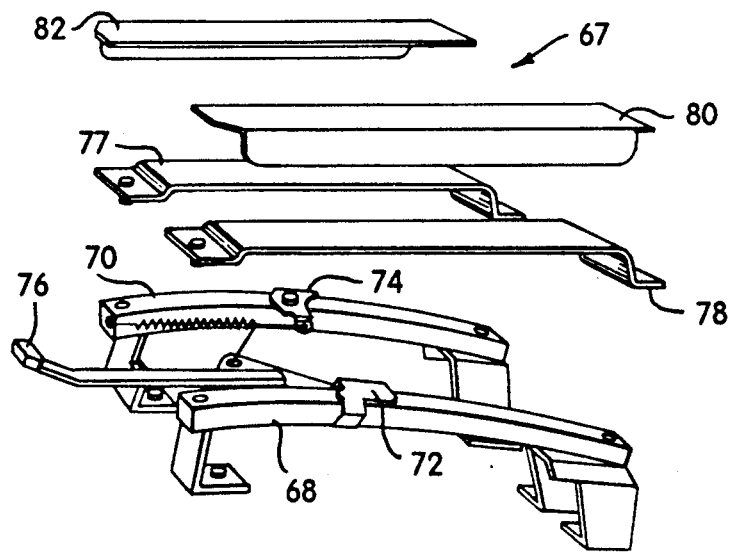
FIG. 9 is an exploded view of a component of the embodiment of FIG. 8.

In an alternative embodiment, base frame 25 is mounted as shown in FIG. 8 on a conventional positioning mechanism 67 of the type shown in FIG. 9. The mechanism of FIG. 9 includes a pair of tracks 68, 70 for a pair of slides 72, 74 that are controlled by a hand operated lever 76. A pair of rails 77, 78 are bolted at their ends to tracks 68, 70 to serve as guides for a pair of slides 80, 82 on which frame 25 is mounted. This mechanism enables the driver to adjust the forward-rearward location of the driver's seat. It will be understood that the present invention contemplates the use of more versatile car seat positioning mechanisms, including six-way motor controlled positioning mechanisms. It will be understood that a passenger's front seat incorporating the principles of the present invention will incorporate a mirror image of the design of the driver's seat depicted herein.

OPERATION

In operation, the driver's or passenger's seat of the present invention is adapted for comfortable use by either a normal driver or passenger, or a disabled driver or passenger. When lift cushion 32 is retracted, this car seat is characterized by the appearance and comfort of an ordinary car seat. However, without any appreciable interference with such normal use, this car seat is adapted for use by a disabled driver or passenger who may steady himself at the window sill of an open door as he presses the "up" or "down" switch for help in sitting or rising. It is to be understood that the "up" and "down" switches need not be actually on the door. In an alternative embodiment, the "up" and "down" switches are at the end of a flexible cable that is carried by the driver to the window sill. In another alternative embodiment the up and down switches are carried by a portable wireless unit that operates through an infrared radiation emitter and an infrared sensor.

What is claimed is:

1. A seat only for a single driver or single passenger at the door of an automotive vehicles, said door moving between closed and open positions at a doorway through which said seat is accessible, said seat comprising:
    (a) seat cushion means presenting a geometrical contour only for said single driver or said single passenger;
    (b) electromechanical means; and
    (c) operational means;
    (d) said seat cushion means including stationary cushion means remote from the doorway and lift cushion means adjacent to the doorway, said stationary cushion means providing the major portion of said geometrical contour of said seat cushion means;
    (e) said lift cushion means being constrained for movement in a path between a retracted position and an extended position;
    (f) said lift cushion means, when in retracted position, presenting, together with said stationary cushion means, a substantially geometrically continuous upper surface having a trough along its front edges;
    (g) said lift cushion means, when in extended position being located upwardly of its retracted position;
    (h) said operational means including manual actuating means for maintaining movement between said retracted position and said extended position when under constant manual control;
    (i) said actuating means being accessible to said constant manual control in close proximity to the doorway of said automotive vehicle.

2. The seat of claim 1 wherein the outward edge of said lift cushion is rounded.

3. The seat of claim 1 wherein the transverse width, along the front edge of said seat is such that the transverse width of said lift cushion means is no greater than the transverse width of said stationary cushion means.

4. The seat of claim 1 wherein said path is arcuately developed about a center that is to the right of the center of said back cushion with respect to a driver sitting in said seat.

5. The seat of claim 1 wherein said operational means comprises slide means and guide means for constraining said slide means along said path.

6. The seat of claim 1 wherein said path is disposed along a line upwardly and outwardly from said center of said seat.

7. A seat only for use by a single person at the door of an automotive vehicle, said door moving between closed and open positions at a doorway through which said seat is accessible said seat comprising:
   (a) a back cushion presenting a substantially continuous contour for accommodating said single person;
   (b) a seat cushion assemblage presenting a substantially continuous contour for accommodating said single person;
   (c) an electrical control circuit electromechanical means; and
   (d) a mechanical movement;
   (e) said seat cushion assemblage including a stationary cushion remote from the doorway and a lift cushion means adjacent to the doorway;
   (f) said mechanical movement constraining said lift cushion in a path between a retracted position continuous with said stationary cushion and an extended position removed from said stationary cushion;
   (g) said lift cushion, when in retracted position, presenting, together with said stationary cushion a substantially geometrically continuous upper surface having a trough along its front edge, a major portion of said continuous upper surface being presented by said stationary cushion;
   (h) said lift cushion, when in extended position being located upwardly of its retracted position, but inwardly of said doorway;
   (i) said electrical control circuit including a switch for maintaining movement between said retracted position and said extended position only when under manual contact;
   (j) said switch being accessible in close proximity to the window sill of said door of said automotive vehicle.

8. The seat of claim 7 wherein the outward edge of said lift cushion is rounded to permit sliding of a person thereabout.

9. The seat of claim 7 wherein the transverse width along the front edge of said seat is such that the transverse width of said lift cushion is no greater than one-half of the transverse width of said seat cushion assemblage.

10. The seat of claim 7 wherein said path is arcuately developed about a center that is to the right of the center of said back cushion with respect to a driver sitting in said seat.

11. The seat of claim 7 wherein said mechanical movement comprises a slide and a guide for constraining said slide along said path.

12. The seat of claim 7 wherein said path is disposed along a line upwardly and outwardly from said center of said seat.

13. A seat only for a single driver or single passenger at the door of an automotive vehicle, said door moving between closed and open position at a doorway through which said seat is accessible said seat comprising:
   (a) back cushion means presenting a geometrical contour only for said single driver or said single passenger;
   (b) seat cushion means including stationary cushion means and movable cushion means presenting a geometrical contour only for said single driver or said single passenger;
   (c) electromechanical means; and
   (d) operational means;
   (e) said movable cushion means being constrained for movement by said electromechanical means in path between a retracted position and an extended position;
   (f) said movable cushion means, when in extended position, being located upwardly of its retracted position;
   (g) said operational means including manual actuating means for controlling said electromechanical means for maintaining movement between said retracted position and said extended position when under constant manual control by said single driver or said single passenger;
   (h) said actuating means being accessible to said constant manual control in close proximity to said doorway of said automotive vehicle;
   (i) said seat cushion means including said stationary cushion means and said movable cushion means being normally accessible to an ordinary single driver or single passenger when said movable cushion means is in retracted condition
   (j) said stationary cushion means and said movable cushion means together presenting a substantially continuous upper geometrical contour for seating only said single driver or said single passenger, a major portion of said geometrical contour being provided by said stationary cushion means.

14. A seat only for a single driver at the door of an automotive vehicle, said door moving between closed and open positions at a doorway through which said seat is accessible, said seat comprising:
   (a) a seat cushion presenting a geometrical contour for said single driver;
   (c) an electromechanical system; and
   (d) a control system;
   (e) said seat cushion including a stationary cushion remote from said doorway and a lift cushion adjacent to said doorway;
   (f) said lift cushion being contrained for movement by said electromechanical system in a path between a retracted position and an extended position;
   (g) said lift cushion, when in retracted position, presenting, together with said stationary cushion, a substantially continuous geometrical seating contour;
   (h) said lift cushion, when in extended position, being located along an upward path vertically and horizontally with respect to said retracted position;
   (i) said control system including a manual actuator for electrically energizing said electromechanical system to establish movement between said retracted position and said extended position;
   (j) said actuator being manually accessible in close proximity to said doorway;
   (k) said stationary cushion and said lift movable cushion together presenting a substantially continuous upper geometrical contour for seating only said single driver, the major portion of said geometrical contour being provided by said stationary cushion.

15. The seat of claim 14 wherein the transverse width along the front edge of said seat is such that the transverse width of said lift cushion is no greater than the transverse width of said stationary cushion.

16. The seat of claim 14 wherein said electromechanical system includes a motor for effecting said movement.

17. The seat of claim 16 wherein said control system includes a safety switch which permits energization of said motor only during manual actuation.

18. A seat only for a single driver at the door of an automotive vehicle, said door moving between closed and open positions at a doorway through which said seat is accessible, said seat comprising:
   (a) a back cushion presenting a geometrical contour only for said single driver;
   (b) a seat cushion presenting a geometrical contour only for said single driver;
   (c) an electromechanical system; and
   (d) a control system;
   (e) said seat cushion including a stationary cushion remote from said doorway and a lift cushion adjacent to said doorway;
   (f) said lift cushion being constrained for movement by said electromechanical system in a path between a retracted position and an extended position;
   (g) said lift cushion, with said stationary cushion, presenting a substantially continuous geometrical seating contour;
   (h) said lift cushion, when in extended position, being located upwardly of its retracted position;
   (i) said control system including a manual actuator for electrically energizing said electromechanical system to establish movement between said retracted position and said extended position;
   (j) said actuator being manually accessible in close proximity to said doorway;
   (k) the transverse width along the front edge of said seat being such that the transverse width of said lift cushion is less than the transverse width of said stationary cushion;
   (l) said electromechanical system includes a motor for effecting said movement;
   (m) said control system including a safety switch which permits energization of said motor only during manual actuation;
   (n) and whereby said driver can swing his or her legs outwardly through said doorway when said lift cushion is in retracted condition.
   (o) said stationary cushion and said lift cushion together presenting a substantially continuous upper geometrical contour for seating only said single driver, the major portion of said geometrical contour being provided by said stationary cushion.

* * * * *